US 7,643,446 B2

(12) United States Patent
Chu

(10) Patent No.: US 7,643,446 B2
(45) Date of Patent: Jan. 5, 2010

(54) ROUTE OPTIMIZATION OF MEDIA CHANNEL IN MOBILE WIRELESS NETWORK

(75) Inventor: Thomas P. Chu, Englishtown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 422 days.

(21) Appl. No.: 11/583,273

(22) Filed: Oct. 18, 2006

(65) Prior Publication Data

US 2008/0096570 A1    Apr. 24, 2008

(51) Int. Cl.
*H04W 40/00* (2009.01)
(52) U.S. Cl. .................. 370/328; 455/445; 455/450; 370/238; 370/351
(58) Field of Classification Search .......... 455/445, 455/450; 370/351
See application file for complete search history.

(56) References Cited

U.S. PATENT DOCUMENTS 6,236,642 B1 * 5/2001 Shaffer et al. .............. 370/237

| | | | |
|---|---|---|---|
| 6,553,420 B1 * | 4/2003 | Karger et al. | 709/226 |
| 6,714,559 B1 * | 3/2004 | Meier | 370/449 |
| 2007/0005971 A1 * | 1/2007 | Leung et al. | 713/171 |
| 2008/0002661 A1 * | 1/2008 | Iyer et al. | 370/351 |

* cited by examiner

*Primary Examiner*—Dwayne Bost
*Assistant Examiner*—Christopher Henry
(74) *Attorney, Agent, or Firm*—Carmen Patti Law Group, LLC

(57) ABSTRACT

An exemplary embodiment of a method is implemented in a wireless network and is advantageous in that an undesired interim media channel link which would have been used in prior art systems is identified during call setup and avoided. In response to a call request in the wireless network for a call with a first user's wireless subscriber unit, a determination is made if one of a calling home node and a called home node of the first user's wireless subscriber unit should not be used as a node in the media channel such as due to the one node's remote location relative to the rest of the nodes in the media channel. A resulting media channel is established so that the one of the calling home node and the called home node is not part of a path of the media channel thereby minimizing the total distance and delay of the media path.

14 Claims, 9 Drawing Sheets

ROUTE OPTIMIZATION OF MEDIA CHANNEL IN MOBILE WIRELESS NETWORK

FIELD OF INVENTION

This invention relates to wireless mobile networks and more specifically to the communication path established between subscriber units through nodes of the network especially, but not limited to, when one of the calling and called wireless units is located away from its home location.

BACKGROUND

Wireless subscriber units (SUs) are supported by wireless networks located at various geographic locations. A subscriber of wireless services has his subscriber unit registered in a home network at a home location register (HLR) or its equivalent. When traveling the subscriber is served by another network that uses a signaling channel and a media channel to establish wireless communications. As used herein a "media channel" refers to the communication path over which user information is conveyed, which is contrasted with a signaling channel that carries command and control information associated with the setup, management and termination of a media channel. The subscriber's HLR keeps track of the current location of the subscriber unit and serves as an "anchor" point for the voice traffic with a wireless subscriber unit. When the subscriber is served by another remote network, the media channel will likely include one or more wireline links as part of the voice path to the subscriber's home HLR in addition to the wireless link that supports the subscriber's wireless subscriber unit.

However, this routing for a media channel is not efficient in some situations. Assume there is a disaster in the Los Angeles (LA) area, and some firefighters from New York City (NYC) travel to LA to help. A firefighter from NYC using a first wireless SU is currently located at the LA area, while a firefighter from LA uses a second SU. The HLR of the first SU is at NYC, while both the serving node for the first SU and the HLR of the second SU are at LA. The path for the media channel includes cross-country links between LA and NYC. Similarly, if the firefighter from LA calls the visiting firefighter from NYC, the same cross-country path links would occur.

SUMMARY OF THE INVENTION

I have recognized that it would be advantageous to better control of the media path routing so as to minimize undesired interim path links. To this end, the present invention minimizes the assignment of undesirable inter-node loops in the media path when a wireless subscriber is away from his home network. This is achieved by routing the media path without incorporating therein the subscriber's home node when it is determined that the wireless subscriber unit is away from its home network. Note, by way of contrast, that the subscriber's home node is conventionally assigned as one of the nodes in the media path by the prior art. In accordance with an aspect of the invention, the home node is eliminated as a requirement of the media path regardless of whether the subscriber originates the call, in which case the home node is termed a calling home node, or the subscriber receives the call, in which case the home node is termed a called home node. Advantageously the total length and delays associated with the media path for a subscriber away from his home network are reduced.

An exemplary embodiment of a method is implemented in a wireless network and is advantageous in that an undesired interim media channel link which would have been used in prior art systems is identified during call setup and avoided. More specifically, in response to a call request in the wireless network for a call with a first user's wireless subscriber unit, it is determined whether or not the home node of the first user's wireless subscriber unit, which may be a calling home node or a called home node, should not be used as a node in the media channel due to the node's remote location relative to the rest of the nodes in the media channel. When it is determined that the first user's home node should not be used, a media channel is established so that the home node is not part of the path of the media channel, thereby minimizing the total distance and delay of the media path.

In another embodiment, the home node of the first user can request that the home node of the other user on the call, i.e., its peer home node, be removed from the media path.

In a further embodiment, both the home nodes of both users can be removed from the media path and another node in the system, e.g., one of the serving nodes, can be requested to serve as the anchor point of the media traffic for the call.

DETAILED DESCRIPTION

Figure 1:
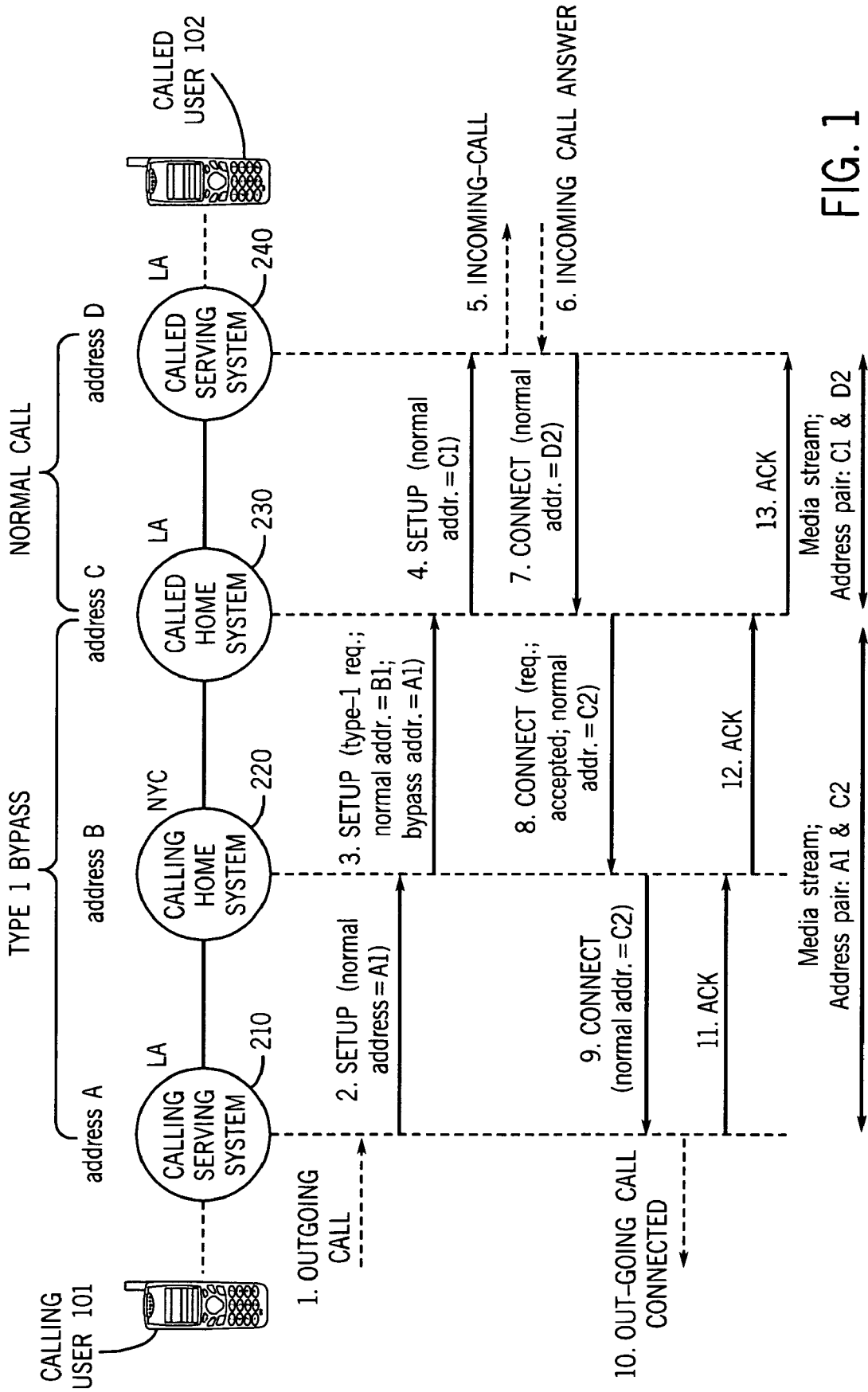
FIG. 1 is an illustrative embodiment of the present invention of a call setup procedure where the calling home node is not part of the media channel.

Consider the situation where the calling home node is in one city, while all the other system nodes are at another city. The media path would be improved if the calling home is removed from, i.e., is not part of, the media path. The call signaling protocol in this example is based on Session Invitation Protocol (SIP), while the voice traffic is carried on the media channel through the use of Real Time Protocol (RTP). Per an embodiment of the present invention, the calling home node can signal a bypass request to the called home in the Setup message. In the same request, the calling home node could provide two network internet protocol (IP) addresses to the called home system. One address is the network address of the calling serving system, and this address would be used by the called home system if the bypass request is accepted. The other IP address is from the calling home node and is to be used if the bypass requested is rejected. If the called home accepts the request, the calling home node would forward the address from the called home node to the calling serving system so that the media communication channel will go directly between the called home node and the calling serving node, thereby bypassing the calling home node. Similarly, the called home node or both home calling and called nodes can be requested to be removed from the media path. If the request(s) is rejected, normal media channel routing would be established through each home node.

In the United States, the standard of public safety wireless network is the Association of Public Safety Communications Officials (APCO) Project 25 (P25) Systems whose specifications are the responsibility of the Telecommunications Industry Association (TIA), standard committee TR-8. Although an exemplary P25 system is described below and used as illustrative examples of embodiments of the present invention, other systems and signaling protocols can be constructed and/or used in accordance with the present invention. Embodiments of the present invention are especially, but not exclusively, suited for use with IP based connecting networks. The over-the-air interface protocol can be of any wireless technology. An example of such a wireless system is the radio frequency sub-system (RFSS) of a P25 system as specified by the TIA TSB 102 series of standards.

For a subscriber-to-subscriber call, the call signaling according to prior art methods would pass through all four entities, in the following order:

The calling serving system (node): This is the system/node where wireless communications with the calling subscriber is currently supported.

The calling home system (node): This is the system where information on the calling subscriber is maintained. When a subscriber roams from a system to another, it will register with its home system. Because of this, the home system of a subscriber knows the current location of the subscriber.

The called home system (node): The same as the calling home system except it is for the called subscriber.

The called serving system (node): This is the system where the called subscriber is currently served by wireless communications.

As a subscriber can roam between systems, the calling and called serving systems may change during a call. The above definitions are logical designations in the sense that one physical system or one serving node could be home to both subscribers.

Media traffic, e.g., voice traffic, in general, also passes through the above mentioned nodes in prior art systems. As previously explained for certain call scenarios, the routes of the media traffic are not efficient or desirable.

Embodiments of the present invention provide enhancements to the call signaling procedure over the network so that the media channel can be improved. Specifically, some of the functional enhancements to the call signaling procedure provided by the embodiments of the present invention are:

A home system, either calling or the called home system, can request itself to be removed from the media path. This type of request is referred to as "type 1 bypass request" or just "bypass request".

A home system, either the calling or the called home system, can request its peer home node to be removed from the media path. This type of request is referred to as "type 2 bypass request".

A home system can request another system, not necessarily one of the four systems/nodes that would typically be involved in the call, to be an "anchor point" for the media traffic. That is, traffic from the calling and called serving nodes will forward the traffic to a peer system/node for the duration of the call, where the peer node is not either the home calling node or the called home node. This type of request is referred to as "new anchor request".

In all these requests, the recipient of the request in accordance with embodiments of the present invention can accept or reject the request. If the request is rejected, the call paths will proceed as a normal call. Also, when a system is bypassed (or removed) from the media path, the signaling path is unchanged, i.e., signaling messages still pass through the normal system nodes in accordance with the embodiments of the present invention. One of the factors on whether to request a bypass is the distance among the nodes in the media path, i.e., whether one or more of the nodes is not proximate to the other nodes in the media path. As used herein, one node being proximate to another node means that the one node is less than a predetermined distance from the other node.

Terminology

For most wide area call signaling protocols, the following functional messages are supported in call set-up:

Setup: This is the message sent by an entity to set up a call between itself and its peer (the entity receiving this message).

Connect: This is the message sent upon recipient of the Setup message indicating the call has been set up successfully.

Confirm: This is the message sent by a end-point in response to the Connect message, indicating it has received the Connect message.

In systems based on the SIP protocol, the above three messages are implemented as the INVITE, 200 OK, and ACK messages. In many instances, a call may take time to process; in this case, the recipient of the Setup message may response with a Progress message before sending the Connect message. In an embodiment based on the SIP protocol, this consists of the various 1xx provisional response messages. The Disconnect message and its acknowledgement are used to tear down a call. In SIP protocol systems, this is the BYE and the corresponding 200 OK messages.

A call may be modified during the duration of the call; this is accomplished through the Modify message. The Connect message can be used acknowledge the modification. In an SIP system, mid-call modification is accomplished by sending the INVITE message again; these INVITE messages are referred to as re-INVITEs.

All call signaling messages can carry many parameters. As described below for embodiments of the present invention, the signaling messages can carry the following parameters:

Request: This parameter is used to indicate the sender of the message is requesting a type-1 bypass, a type-2 bypass, or new-anchor request.

Request acknowledgement: This parameter is used to indicate whether a request is accepted or rejected.

Normal Address: This is the network address where media traffic will be sent assuming the call proceeds as a normal call (i.e. normal path allocation). This is the address that will be used if a request is rejected.

Bypass Address: This is the network address where media traffic will be sent if the request is accepted.

New anchor address: This is the network address of the new anchor point.

For an IP network, a network address will be an IP address of a specified node together with a corresponding UDP port number. Although a system may use the same IP address for all traffic, different UDP port numbers could be assigned for different traffic segments of the same call.

In embodiments of the present invention based on the SIP protocol, request, request acknowledgement, bypass address, and new anchor address are new parameters and can be encoded in a number of ways (e.g., in the message body of the SIP message). The normal address is usually encoded in the SDP portion of the SIP messages.

For over the air interfaces, there are four basic functional messages for call set up:
Outgoing call request
Incoming call request
Incoming call answered
Outgoing call connected In the illustrative embodiments where the air interface adheres to the P25 trunked system specification, the above four messages are: UU_V_REQ, UU_V_ANS_REQ, UU_V_ANS_REP, and UU_V_CH_GRANT, respectively.

At a serving system, over the air interface signaling messages will be mapped to call signaling messages over the wide area network:
The outgoing call request over the air interface would be mapped to a outgoing Setup message over the wide area network.
An incoming Setup message from the wide area network will be mapped to an incoming call message over the air interface.
An outgoing call message over the air interface will be mapped to a outgoing Connect message over the wide area network.
An incoming Connect message from the wide area network will be mapped to a outgoing call connected message over the air interface.

In subsequent exemplary descriptions, it is assumed that, at the serving RFSS, outgoing SIP messages are triggered by messages from the air interface, and incoming SIP messages trigger messages to the air interface.

Type 1 Bypass (Bypassing the Calling Home)

Referring to FIG. 1, consider the case when a firefighter from NYC visiting LA calls another firefighter whose home is at LA. In this case,
The calling serving system 210, called home system 230, and the called serving system 240 are at LA, with network address pools A, C and D, respectively.
The calling home system 220 is at NYC with network address pool B.

Under prior art call processing, the media path is not optimal as it goes from LA to NYC and then back from NYC to LA, as discussed before; see FIG. 4. One way to improve the route of the media path is to have the calling system 220 identify the locations of the SUs and to initiate a type-1 bypass request to attempt to remove itself from the media path. The procedure for a successful request is illustrated in FIG. 1.

1) User 101 (visiting NYC firefighter) initiates the call with an "outgoing call request" over the air interface (message 1 in FIG. 1). The calling serving system 210 converts this request to a Setup message (message 2) and sends this message to the calling home system 220. The Setup message would contain the normal address (A1) from 210. So far, the call proceeds as a normal, i.e., prior art, call.

2) System 220 determines that user 101 is at system 210 which is located at LA. It also determines that the home of user 102, the called party, is system 230 also located at LA. Based on this information, RFSS 220 decides that it is better if RFSS 210 would send the media traffic to RFSS 230 directly, bypassing system 220. Therefore, system 220 will forward the Setup message (message 3) to the called home system 230 with the normal call information, but with the following additional information:
   a. A type-1 bypass request indicating that it wants to be removed from the media path.
   b. A normal network address, to be used if the bypass request is rejected. This address (B1) will be for itself.
   c. The bypass network address to be used if the request is accepted. This address is encoded with the address in the Setup message from system 210 (address=A1).

3) Upon receipt of the above Setup message, system 230 will decide whether to reject the request or not. In either case, it will forward the Setup message to system 240, the called serving system. The call will proceed as a normal call (messages 4, 5, 6, and 7) until system 230 receives the Connect message (message 7) from system 240.

4) Assuming that system 230 accepts the type-1 bypass request, it will forward the Connect message (message 8) to 220 with the additional information that the bypass request is accepted.

5) System 220, upon receipt of the above Connect message, would forward the Connect message to system 210. In this message, the normal address location is encoded with the address provided by system 230 (address C2), as opposed to using an address from itself (address B2) as would have occurred in normal prior art call setup.

6) The rest of the call signaling (messages 9, 10, 11, 12 and 13) proceeds as a normal call.

Figure 3:
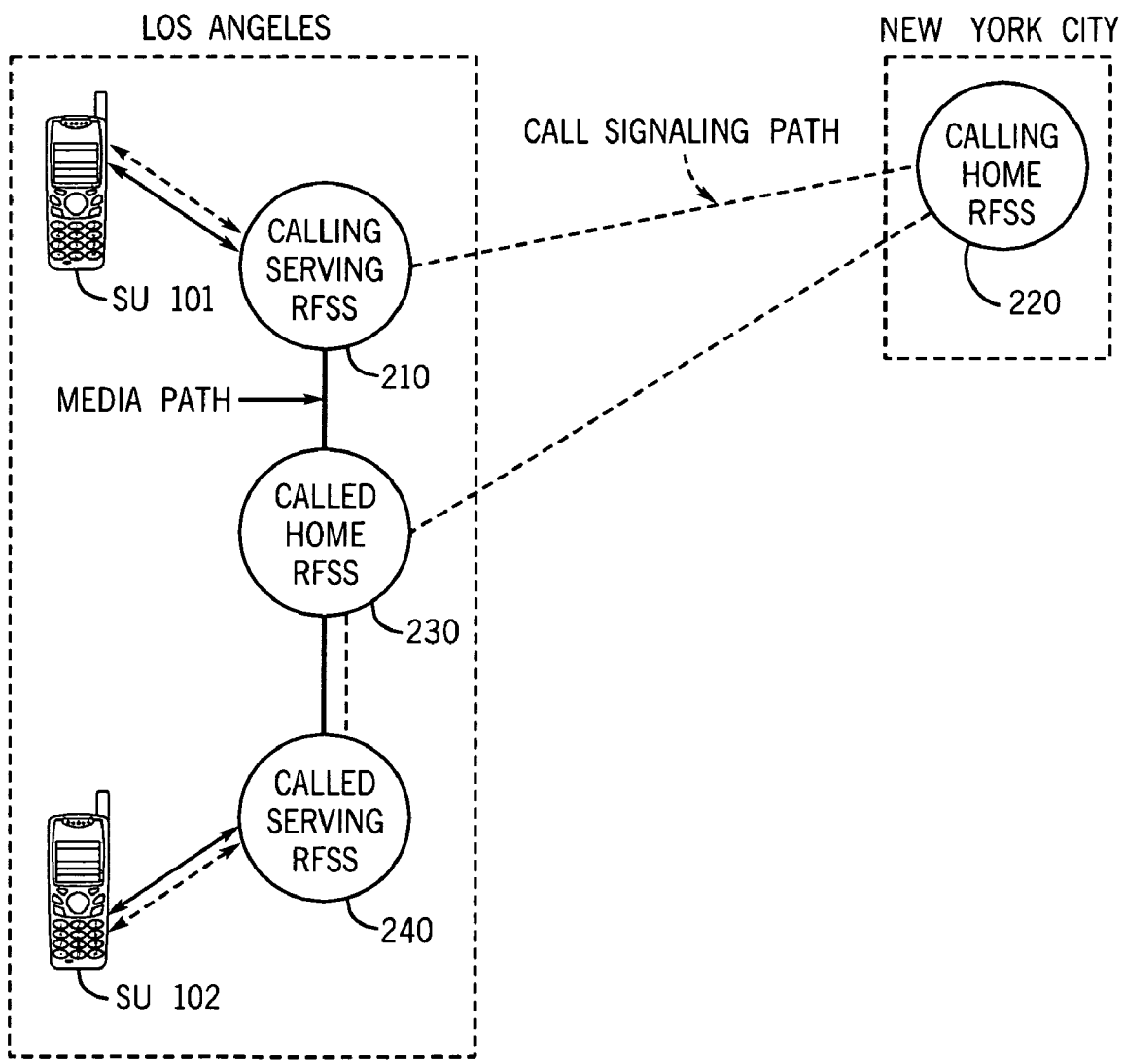
FIG. 3 shows the resulting media channel when the calling home node is bypassed as per FIG. 1.

After completion of a successful bypass request, the NYC system 220 will not be in the media path as shown by the packet flow at the bottom of FIG. 1 but system 220 will remain in the signaling path. The media and signaling paths for this bypass of system 220 are illustrated in FIG. 3.

Figure 2:
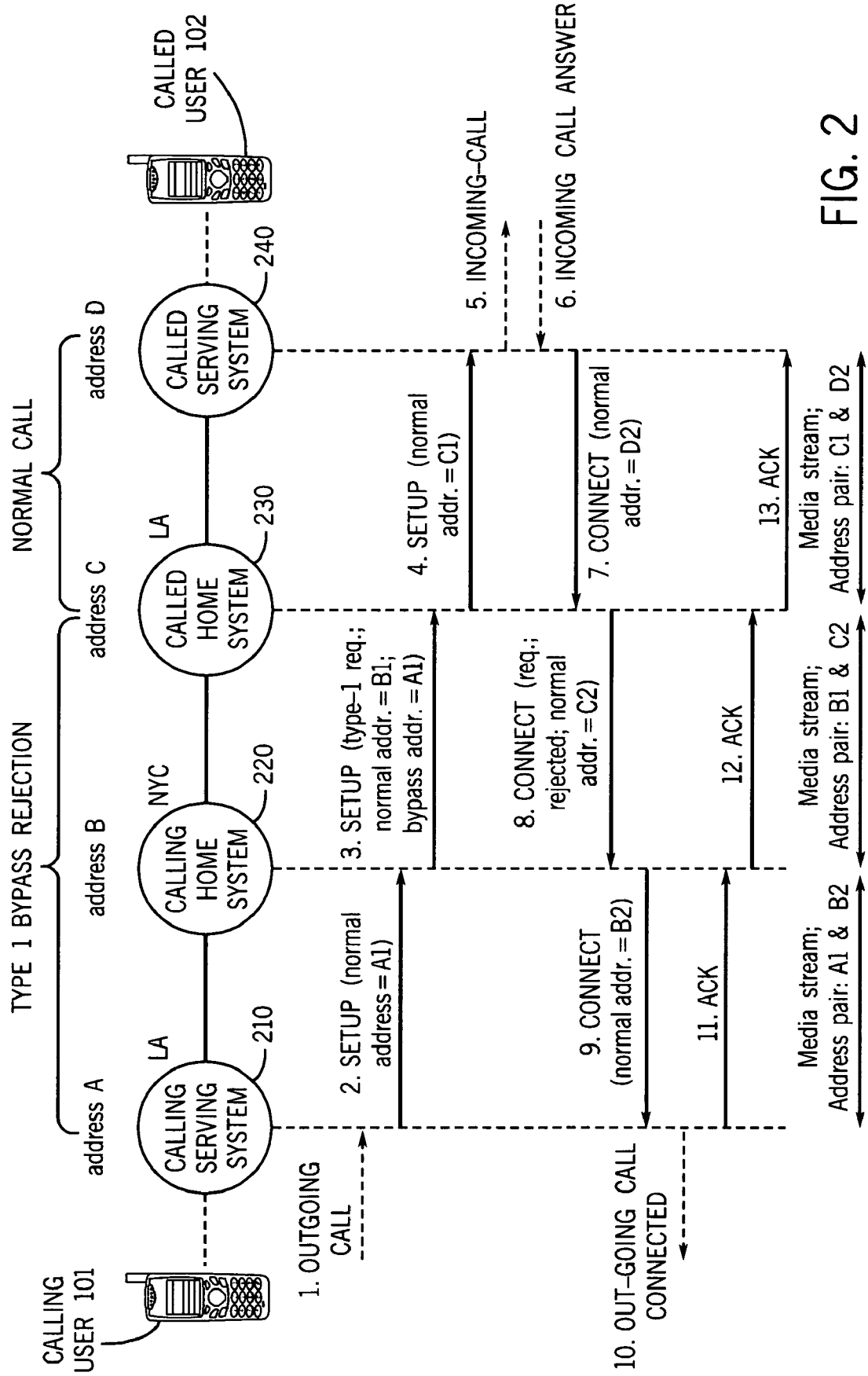
FIG. 2 is similar to FIG. 1 except that a request to bypass the calling home node is rejected.

Referring to FIG. 2, the called home system 230 may elect to reject the bypass request from system 220 because of a number of reasons. For example, user 102 may be at NYC at this time and it would be better if system 230 was removed from the media path rather than system 220. In this case,
System 230 would indicate to system 220 in message 8 that it rejects the bypass request.
System 220 would use an address from itself (B2) instead of the one from system 230 (C2) in message 9.

Basically the call proceeds as a normal call setup following the bypass rejection since all four of the nodes shown in FIG. 2 will be in the media channel path; see the packet flows on the bottom of FIG. 2.

Roaming During Existing Call When the Calling Home System is Bypassed

Assume that the above described type-1 bypass request was made and accepted, i.e., the calling home system 220 in NYC is bypassed. When user 102 roams during an existing call, the procedure will be the same as roaming for normal prior art call as system 230 is the home of user 102 and it will know where user 102 is located and can handle roaming requests by 102 in the normal manner. However, if user 101 roams during an existing call, the procedure for handling roaming will be different than roaming procedures for normal prior art call, as the calling home system 220 is not part of the media path (although it is still in the call signaling path).

Figure 4:
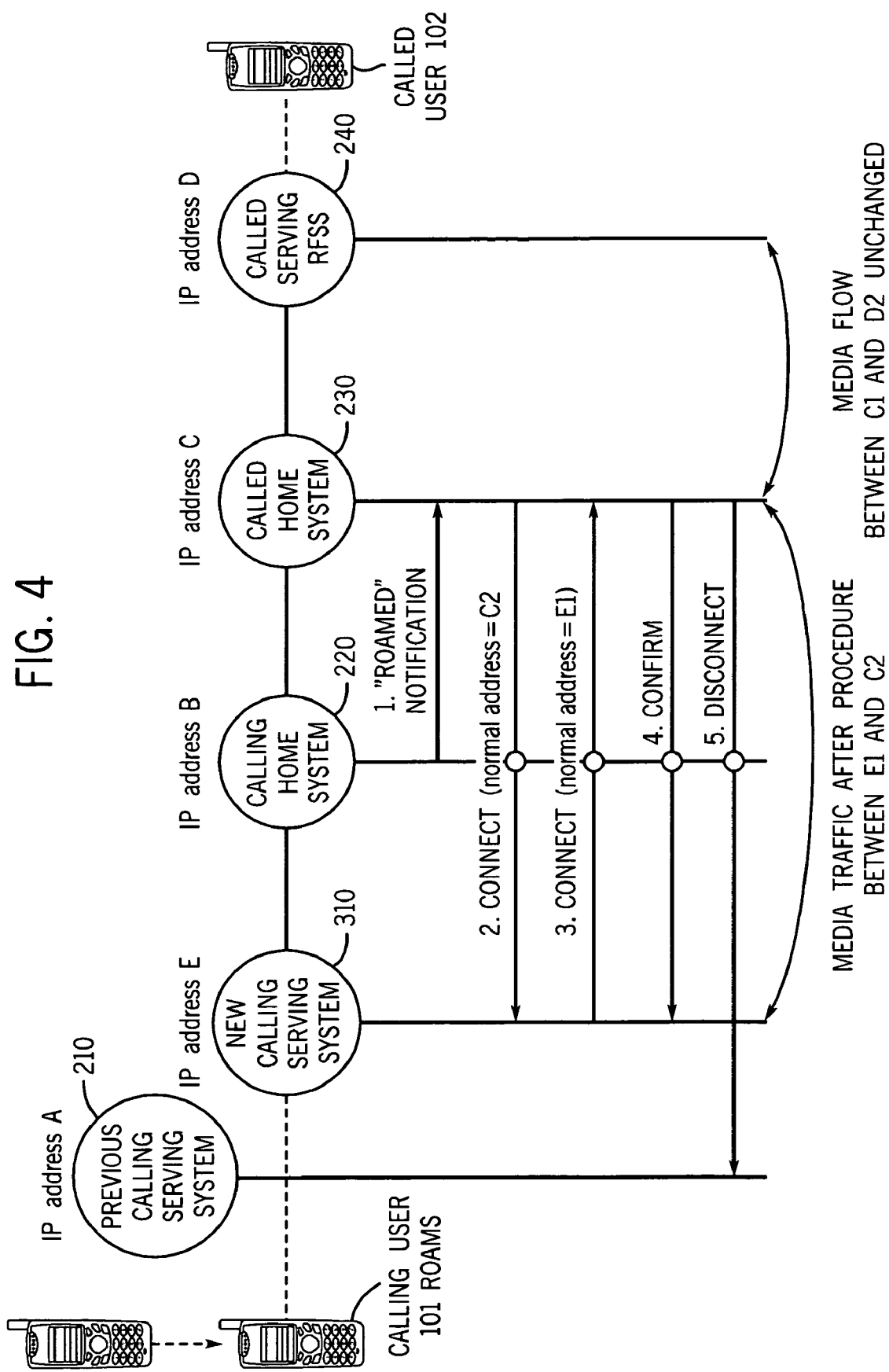
FIG. 4 shows an illustrative architecture and procedure in accordance with the present invention for the handoff of an existing call.

In a first method for supporting roaming as shown in FIG. 4, the calling home system 220 sends a notification to system 230 of the called home system, the anchor point of the media traffic for the call, that user 101 has roamed (during an existing call) to system 310. Upon this notification, system 230 establishes a connection for media traffic to system 310. Specifically, the procedure is as follows:

1) Once system 220 determines that user 101 has roamed to system 310 (through the registration process), it will send a "Roamed" notification to system 230. This notification would contain the identity of the system 310 and user 101.
2) System 230 then sends a Setup message to system 310 using the current address (C2) as the normal address. This message will go through system 220 as system 220 remains in the signaling path.
3) Upon the receipt of the Setup message, system 310 responds with a Connect message, which would contain its normal address (E1) for this call. This message will go through system 220.
4) Upon the receipt of the Connect message, system 230 then responds with an Confirm message, completing the transaction. This message will go through system 220.
5) At the same time, system 230 will send a Disconnect message to system 210, the previous serving system for user 101, terminating the media flow to/from system 210. This message will go through system 220.

At the end of the above process, the media flow is between system 310 and system 230 using address pair (E1, C2). This method for handling roaming is known as the "notification method". Assuming the protocol is SIP based, there are a number of ways to send the "Roamed" notification:

Use the NOTIFY message
Use the REFER message
Use the INFO message

Figure 5:
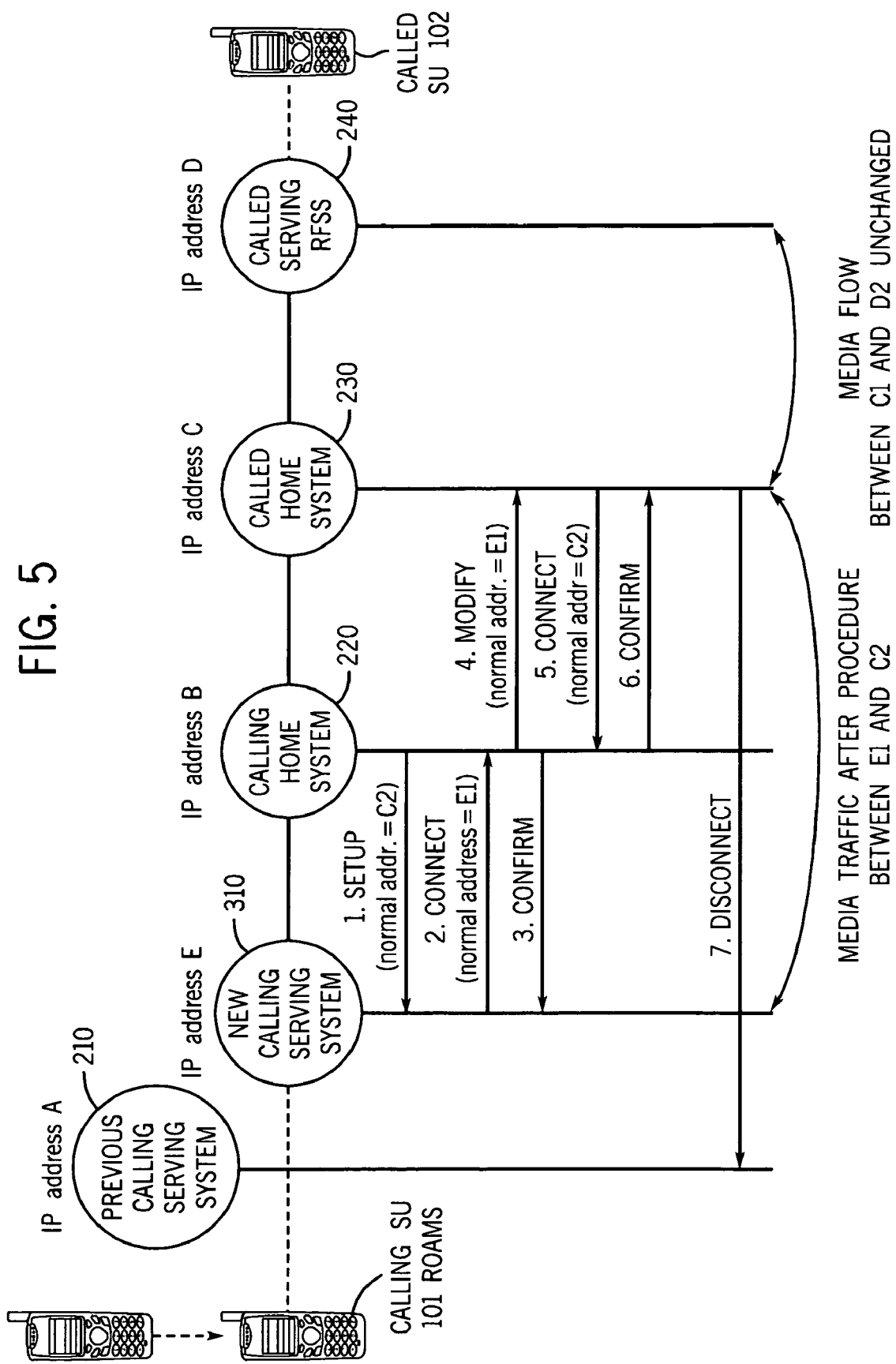
FIG. 5 shows an alternate illustrative architecture and procedure in accordance with the present invention for the handoff of an existing call.

FIG. 5 illustrates another method for supporting roaming as follows:

1) Once system 220 determines that user 101 has roamed to system 310 (through the registration process), it will send a Setup message to system 310. The address in this message will be encoded with the current address used by the system 230 in receiving media traffic from user 101 (address C2).
2) Upon receipt of this Setup message, system 310 will respond with a Connect message. Encoded in this message is the address to be used by system 310 for this call (address=E1).
3) Upon the receipt of this message, system 220 will first respond with a Confirm message to system 310.
4) At the same time, system 220 will send a Modify message to system 230, informing that the network address for media traffic of its peer has changed from system 210 to system 310 (from A1 to E1).
5) System 230 responds with a Connect command acknowledging the modification.
6) System 220 responds with a Confirm message completing the process.

Other variations are possible to support such roaming. In general, the method that is simpler and requires fewer messages will be the preferred method, unless other factors dictate another choice.

Type 1 Bypass Request (Bypassing the Called Home)

Figure 6:
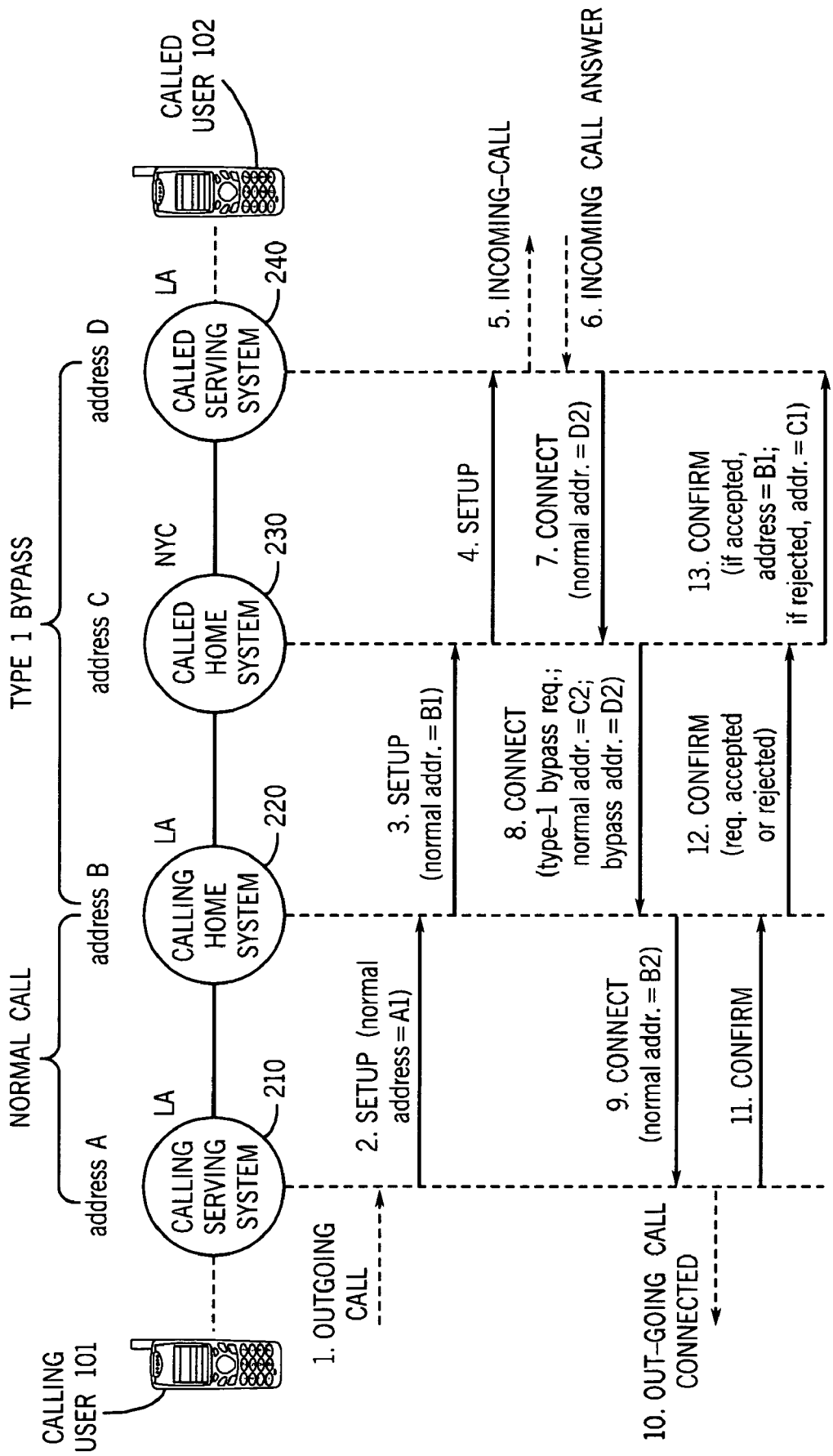
FIG. 6 is an illustrative embodiment of the present invention of a call setup procedure where the called home node is not part of the media path.

Referring to FIG. 6, assume that a local firefighter using phone 101 at LA calls the visiting firefighter's phone 102 from NYC (but currently at LA). Thus systems 210, 220, and 240 are at LA, while system 230 is at NYC. The procedure is as follows:

1) User 101 initiates the call and sends an "outgoing call" message over the air interface to its serving system 210.
2) System 210 converts the "outgoing call" message to a Setup message and sends it system 220. This message will contain an address (A1) from system 210.
3) System 220 forwards the Setup message to system 230. The message will contain an address (B1) from system 220.
4) Upon the receipt the Setup message from 220, system 230 as the home system of user 102 would know that the calling serving system 220, the calling home system 230, and the current serving system for user 102 (system 240) are all are LA, while system 230 is at NYC. Based on this information, system 230 decides that a better route for the media traffic can be obtained if it removes itself from the media path. Thus, system 230 initiates a bypass procedure to do so. It will first forward the Setup message 4 to system 240. However, this Setup message will not contain any address information as would normally be included. This is because, at this time, system 230 does not know whether its bypass request will be accepted or not. The address used will depend on this decision.
5) Upon receipt of the Setup message from system 230, system 240 will sends an incoming call message to user 101 over the air interface.
6) Assuming that user 102 answers the call, the end-point equipment would send an incoming call answered message back to system 240.
7) Upon receipt of the incoming call answered message, system 240 sends a Connect message to system 230. This message will contain an address (D2) from system 240.
8) System 240 forwards the Connect message to the calling home system 220 containing the following information:
    A type-1 bypass request indicating that system 230 wants to remove itself from the media path.
    A normal address for itself (C2) to be used by system 220 if the by-pass request is rejected; and the bypass address (D2) to be used if the bypass request is accepted; see message 8.
9) System 220 will forward the Connect message to system 210. This message would contain an address from system 220 (B2).
10) Upon receipt of the Connect message from system 220, system 210 will generate an out-going call connected message to user 101 over the air interface.
11) At the same time, system 210 sends a Confirm message 11 back to system 220.
12) System 220 forwards the Confirm message 12 to system 230 with an indication whether the bypass request is accepted or rejected.
13) System 230 forwards the Confirm message 13 to system 240. If the request is accepted, this message would contain the address provided by system 220 (B1). If the request is rejected, it would contain an address from system 230 itself (C1).

Roaming When the Called Home System is Bypassed

The roaming procedure when the called home is bypassed can be the same procedure as described above as when the calling home is bypassed.

Bypass of Both Home Nodes: (a New Anchor Point to be Established)

Figure 7:
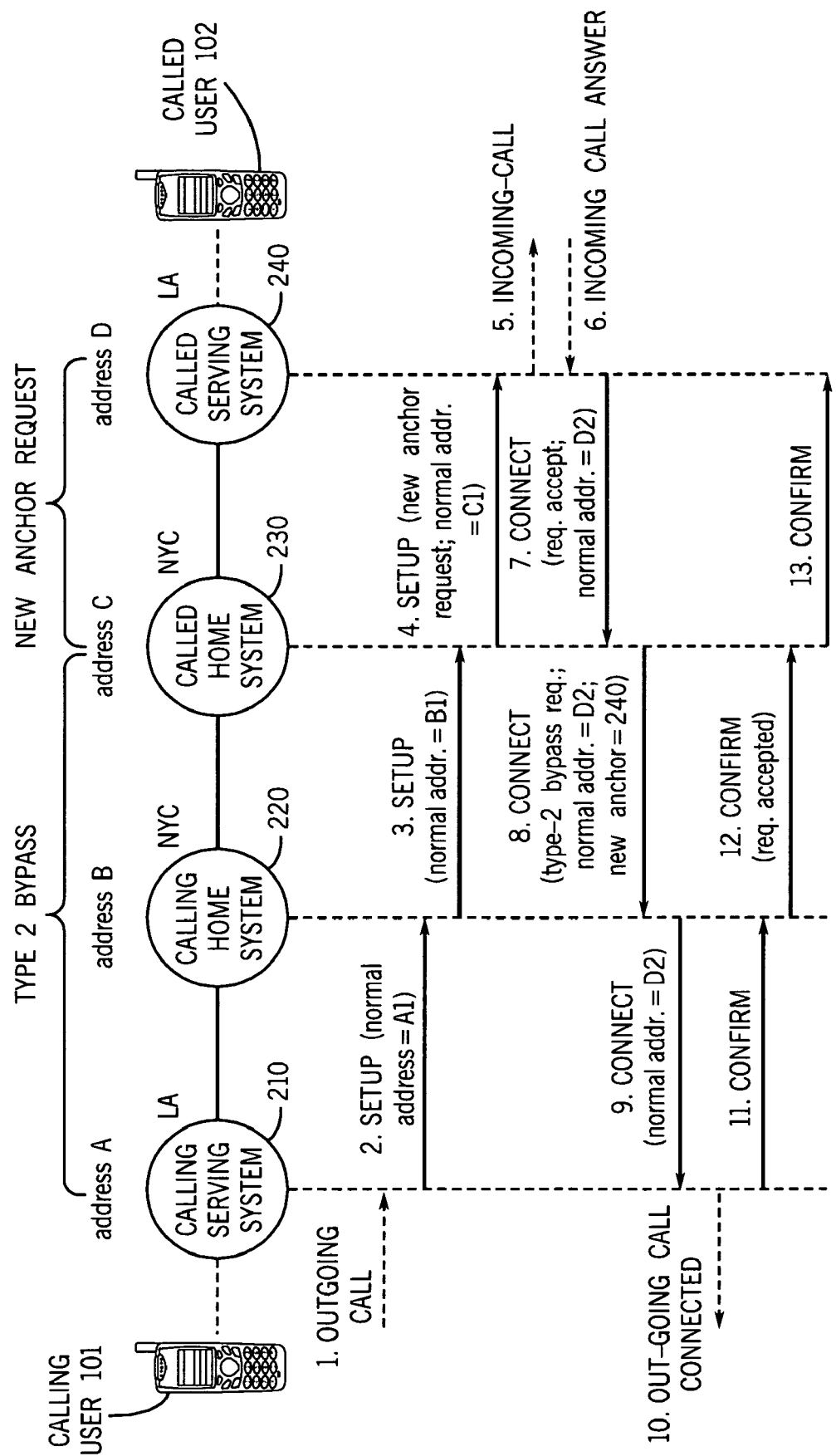
FIG. 7 is an illustrative embodiment of the present invention of a call setup procedure where neither the calling nor called home nodes are part of the media path with the called serving node becoming the new anchor point for the media channel.

Referring to FIG. 7, assume that two NYC firefighters are both currently visiting LA and one using phone 101 calls the other with phone 102. In this case, both home systems 220 and 230 are at NYC while both users and serving systems 210 and 240 are at LA. For best efficiency in media traffic flow, the media path should bypass both home systems and a new anchor point for media traffic at LA should be used.

First, note that home system 230 is the first system to be able to determine that both serving systems 210 and 240 are at LA; that is, system 220 during the initial call setup will not have access to information about the location of the called serving system. System 230 can determine the serving system for user 101 is system 210 from the Setup message (it contains the origin of the call). System 230 can determine that user 102 is at serving system 240 because system 230 is the home of user 102. Therefore, system 230, the called home, would make the decision that the media traffic should bypass both home systems. The process can be implemented as two parts:

First, system 230 would request another system at LA to serve as a new anchor point for the media traffic. A good candidate would be called serving system 240, but this is not the only choice that could be made.

Then, system 230 will request system 220 to remove itself from the media path. This is type-2 bypass request, where a home system requests its peer to remove itself from the media path.

If both requests are successful, then system 240 in LA will be the only anchor point in the media path and an optimal media channel route involving only nodes in LA is achieved. It is easier for a node to remove itself from a media path than to become an anchor point. Therefore, system 230 would seek a new anchor point first, and ascertain its success before sending the type-2 bypass request to system 220.

This procedure is illustrated in FIG. 7 as:

1) User 101 initiates the call and sends an outgoing call message over the air interface to its serving system 210.
2) System 210 converts the outgoing call message to a Setup message and sends it system 220. This message will contain an address (A1) from system 210.
3) System 220 forwards the Setup message to system 230. The message will contain an address (B1) from system 220.
4) Upon the receipt the Setup message from 220, system 230 as the home system of user 102, would know that the calling serving system 220 and the current serving system 240 for user 102 are both at LA, while both home systems are at NYC. Therefore, it decides that a better route for the media traffic can be obtained if both home nodes are removed/bypassed from the media path. First system 230 will initiate the procedure requesting that system 240 become a new anchor point. If successful system 230 will remove itself from the media path. It will first forward the Setup message to system 240. This Setup message would contain the normal address for media traffic from system 230 as well as the request that system 240 to become the new anchor point for media traffic. The normal address is included in the event that system 240 rejects the request to be an anchor point.
5) Upon receipt of the Setup message from system 230, system 240 sends an incoming call message to user 102 over the air interface. It would also need to decide whether it will serve as the new anchor point.
6) Assuming that user 102 answers the call, the end-point equipment would send an incoming call answered message back to system 240.
7) Upon receipt of the incoming call answered message, system 240 sends a Connect message 7 to system 230. This message will contain an address (D2) from system 240 as well as its decision on the new anchor point request. It could accept or reject the request. FIG. 7 illustrates the case that the request is accepted.
8) System 230 forwards the Connect message 8 to system 220 containing the following information, if the anchor request is accepted:
   A type-2 bypass request indicating that system 230 desires that system 220, the calling home, be removed from the media path.
   The address from system 240 (D2).
   The identity of the new anchor point, system 240.
9) System 220 will forward the Connect message 9 to system 210. This message would contain the address from system 240 (D2).
10) Upon receipt of the Connect message from system 220, system 210 will generate an out-going call connected message to user 101 over the air interface.
11) At the same time, system 210 sends a Confirm message 11 back to system 220.
12) System 220 forwards the Confirm message 12 back with an indication whether the type-2 bypass request is accepted or rejected. In this case, it is accepted.
13) System 230 forwards the Confirm message 13 to system 240.

If the new-anchor request is rejected (at step 7), system 230 would not invoke the type-2 bypass request and the call request would proceed as normal.

Figure 8:
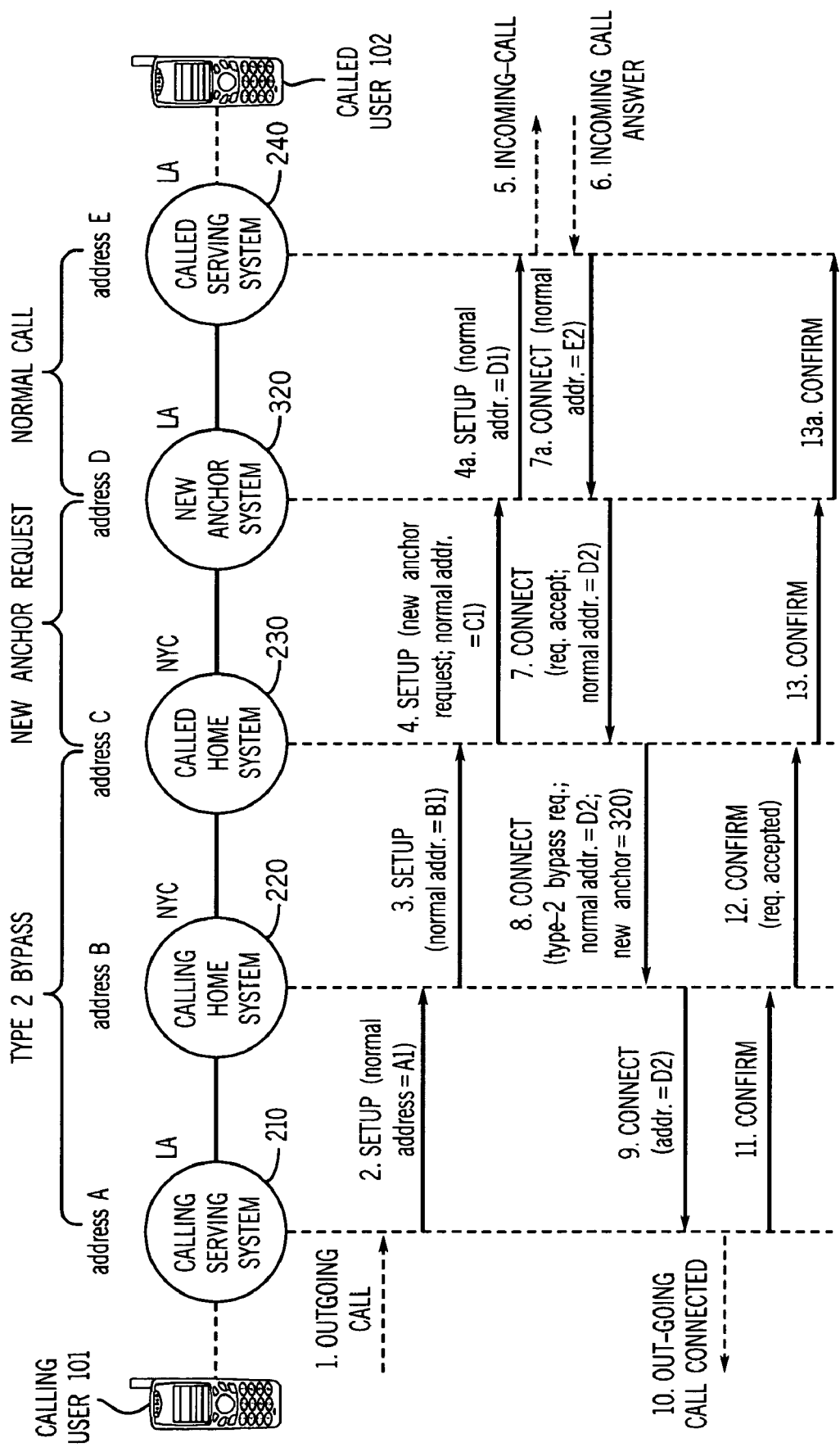
FIG. 8 is an illustrative embodiment of the present invention of a call setup procedure where neither the calling nor called home nodes are part of the media path with the anchor point being a system node other than a serving node.

Referring to FIG. 8, instead of system 240 becoming a new anchor point, another system 320, preferably in LA, could be selected as the new anchor point. This procedure is an extension of the above procedure and its implementation should be apparent based on the above explanation of FIG. 7 and the signal flow as shown in FIG. 8.

Figure 9:
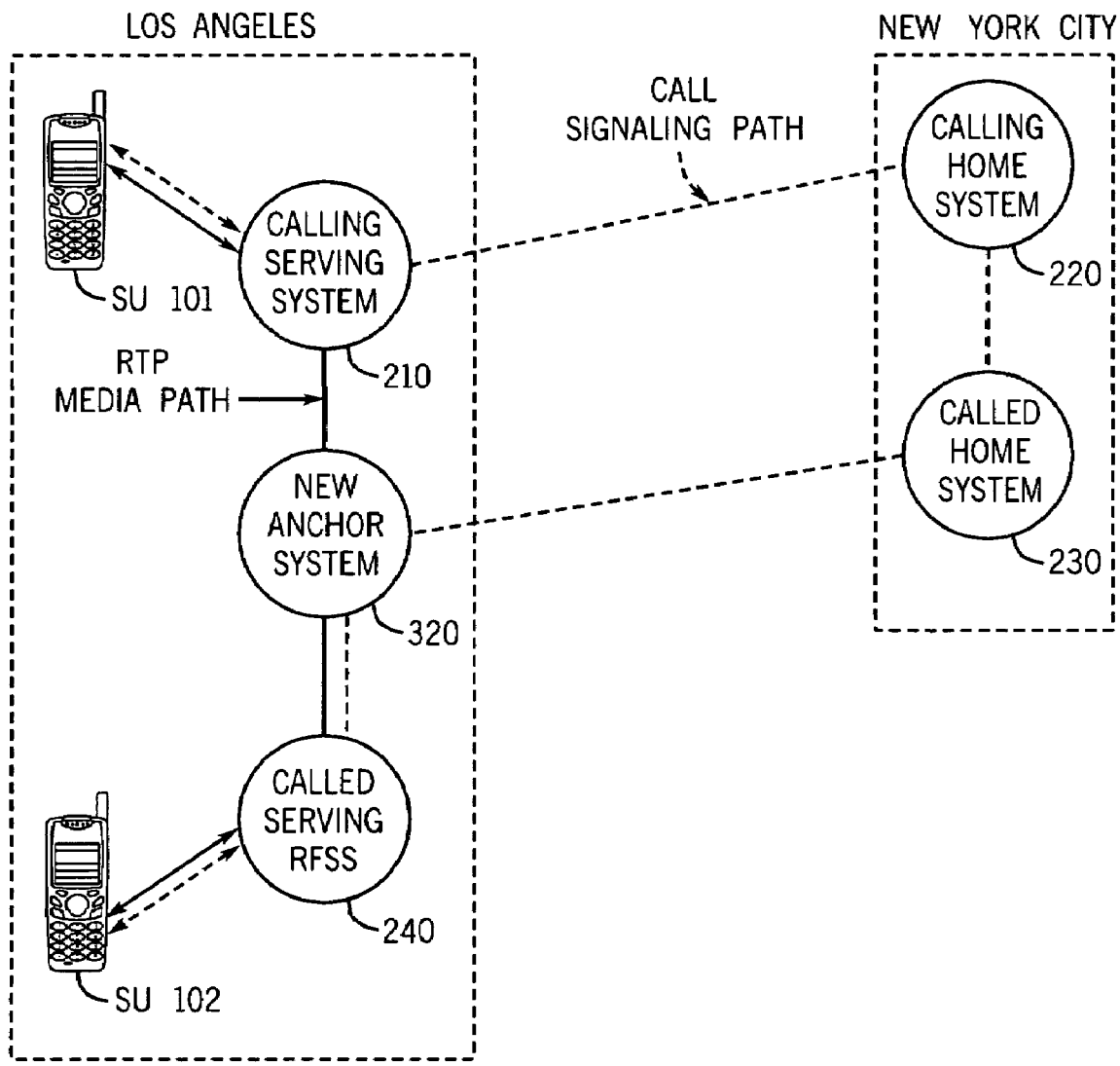
FIG. 9 shows the resulting media channels when the calling and called home nodes are both bypassed as per FIG. 8.

Once the new system at LA becomes the new anchor point and with the both home systems removed from the media path, the media path is as illustrated in FIG. 9 assuming that a new node 320 in LA serves as the new anchor point for media traffic as per FIG. 12*a*. If node 240 became the new anchor point as per FIG. 7, the functionality of 320 would be transferred to 240 and node 320 would be removed from FIG. 9.

Embodiments of the present invention provide innovative methods that improve the paths selected for media traffic including:

A home system can request itself to be removed from the media path. The home system can be either the calling home or the called home.

A home system can request its peer home system to be removed from the media path.

A home system can request another system to be the anchor point of the media traffic for a call.

The above exemplary systems/nodes may each consist of a similar architecture. That is, the architecture may consist of a microprocessor supported by read-only memory, random access memory, nonvolatile data storage, and an input/output module that supports the transmission and reception of data between the node and external devices/environments. The microprocessor operates under the control of stored program instructions that implement the signaling, media traffic control and decision-making functions as described in accordance with the illustrative embodiments.

Various modifications, substitutions and alterations of the illustrative embodiments may be made by those skilled in the art without departing from the scope of the present invention. For example, signaling and media communication paths may be carried by a variety of communication protocols in addition to or other than Internet Protocol. It is not necessary for both end-users to be supported by a wireless network, i.e., one end-user may be supported by a traditional wireline telephone (or other non-wireless system) and the other end-user supported by a wireless communication network. Even a single wireless end-user can benefit such as where the wireless user's serving node is located in a remote network or a substantial distance from the home node of the wireless end-user. The decision on whether to request a bypass and/or accept a request for a bypass can be based on a variety and/or combination of factors, including but not limited to, geographical distances among nodes in the media traffic path, city/state location of the nodes, data transit times between nodes, loading of the respective nodes, end-user provided information or data, etc. Where the location of the nodes is a factor, the decision can be based on the length of the media channel, i.e., whether the bypassing of a node would reduce the length of the media channel by more than a predetermined amount and/or percentage. For example, the decision to bypass a node could be made if doing so would reduce the total length of the media channel and/or total delay of media traveling over the channel by at least 30%. This would prevent incurring the overhead signaling associated with implementing the bypass if only a relatively small performance improvement would be obtained. Both the normal address and a bypass address can be transmitted in the same communication where a bypass request is made so that the decision making node will be have the address to be utilized regardless of whether the bypass request is accepted or not.

Although the embodiments focus on traffic route improvements, the procedures can be used to achieve other objectives based on factors related to the objective. For example, if a system is at or near its capacity limit in handling media traffic, the described procedures can be used to off-load (bypass) media traffic from such a system to another system.

The above embodiments are merely illustrative examples and are not to be construed as limiting the scope of the present invention as defined by the attached claims.

I claim:

1. A method for use in a wireless network for determining nodes through which media traffic will be routed in the wireless network comprising the steps of:
    determining, in response to a call from a first wireless subscriber unit, whether a home node of the first wireless subscriber unit should not be used as a node in a media channel associated with the call; the determining step including:
        transmitting a setup message from the calling party's home node of the first wireless subscriber unit to a called party's home node of a second wireless subscriber unit, where the setup message contains a request by the home node of the first wireless subscriber unit not to be included in the media channel associated with the call, the setup message containing an address for the home node of the first wireless subscriber unit and an address of a serving node of the first wireless subscriber unit;
        determining by the called party's home node whether to comply with the request and communicating the latter determination to the home node of the first wireless subscriber unit;
        transmitting a connect message by the home node of the first wireless subscriber unit to a serving node of the first wireless subscriber unit where the connect message includes a media address to which media channel communications associated with the call are to be directed by the serving node, the media address being the address of the home node of the first wireless subscriber unit upon the called party's home node determining that it will not comply with the request and being the address of the home node of the second wireless subscriber unit upon the called party's home node determining that it will comply with the request;
    establishing the media channel without incorporating the home node of the calling party as part of a path of the media channel upon the called party's home node determining that it will comply with the request.

2. The method of claim 1 wherein the determining step by the node comprises comparing factors associated with the transmission of media traffic over the media channel with and without the calling party's home node being part of the path of the media channel, and determining whether the calling party's home node should be part of the path of the media channel based on results of the comparing of the factors.

3. The method of claim 2 wherein the comparing step comprises obtaining location information of other nodes that will be in the path of the media channel, the establishing step being based on the length of the media channel with the calling party's home node not being part of the path of the media channel being less by a predetermined amount than the length of the media channel with the calling party's home node being part of the path of the media channel.

4. The method of claim 2 wherein the comparing step comprises obtaining traffic delay information associated with other nodes that will be in the path of the media channel, the establishing step being based on the total traffic delay of the media channel with the calling party's home node not being part of the path of the media channel being less by a predetermined amount than the traffic delay of the media channel with the calling party's home node being part of the path of the media channel.

5. A method for use in a wireless network for determining nodes through which media traffic will be routed in the wireless network comprising the steps of:
    determining, in response to a call between first and second user's wireless subscriber units where first and second home nodes in the wireless network support the first and second wireless subscriber units, respectively, whether at least one of the first and second home nodes should not be used as a node in a media channel associated with the call, the determining including:
        transmitting a request as part of call setup messaging by one of the first and second home nodes to the other of the first and second home nodes not to be included as a node in the media channel;
        transmitting a reply as part of the call setup messaging by other of the first and second home nodes to the one of the first and second home nodes, where the reply indicates whether the other will comply with the request;
        in response to receipt of the reply, the one of the first and second home nodes transmitting a message to a visiting node that supports the call, where the latter message specifies an internet protocol address of the one node when the other node did not comply with the request and an internet protocol address of the other node when the other did comply with the request;
    establishing the media channel without incorporating the one of the first and second home nodes as part of a path of the media channel when the determining step determines that the one of the first and second home nodes should not be used as a node in the media channel.

6. The method of claim 5, wherein the determining step comprises comparing factors associated with the transmission of media traffic over the media channel with and without the one of the first and second home nodes being part of the path of the media channel, and deciding whether the one of the first and second home nodes should be part of the path of the media channel based on results of the comparing of the factors.

7. The method of claim 6 wherein the factors comprise information of length of the path of the media channel, the establishing step being based on the length of the media channel with the one of the first and second home nodes not being part of the path of the media channel being less by a predetermined amount than the length of the media channel with the one of the first and second home nodes being part of the path of the media channel.

8. The method of claim 6 wherein the factors comprise information of delay to be encountered by media traveling on the path of the media channel, the establishing step being based on the delay associated with the media channel with the one of the first and second home nodes not being part of the path of the media channel being less by a predetermined amount than the delay associated with the media channel with the one of the first and second home nodes being part of the path of the media channel.

9. The method of claim 5 wherein the first and second home nodes are the calling and called home nodes, respectively.

10. The method of claim 9 wherein the first home node implements the request transmitting step, and the establishing step creates the media channel in which the first home node is not part of the media channel.

11. The method of claim 9 wherein the second home node implements the request transmitting, and the establishing step creates the media channel in which the second home node is not part of the media channel.

12. The method of claim 5 wherein the step of establishing further comprises establishing the media channel so that neither the first home node nor the second home node is used as a node in the media channel, further comprising the step of creating a new anchor point node for the media channel that is neither the first or second home node.

13. The method of claim 12 further comprising the step of transmitting a request to one of first and second serving nodes in the media channel corresponding to the first and second subscriber units, respectively, inquiring if the one will agree to serve as the anchor point node.

14. An apparatus adapted to determine nodes through which media traffic will be routed in the wireless network comprising:

means for determining, in response to a call between first and second user's wireless subscriber units where first and second home nodes in the wireless network support the first and second wireless subscriber units, respectively, whether at least one of the first and second home nodes should not be used as a node in a media channel associated with the call, the determining means including:

means for transmitting a request as part of call setup messaging by one of the first and second home nodes to the other of the first and second home nodes not to be included as a node in the media channel;

means for transmitting a reply as part of the call setup messaging by other of the first and second home nodes to the one of the first and second home nodes, where the reply indicates whether the other will comply with the request;

in response to receipt of the reply, the one of the first and second home nodes transmitting a message to a visiting node that supports the call, where the latter message specifies an internet protocol address of the one node when the other node did not comply with the request and an internet protocol address of the other node when the other did comply with the request;

means for establishing the media channel without incorporating the one home node as part of a path of the media channel upon the determining means determining that the home node should not be used as a node in the media channel.

\* \* \* \* \*

UNITED STATES PATENT AND TRADEMARK OFFICE
CERTIFICATE OF CORRECTION

PATENT NO. : 7,643,446 B2  Page 1 of 1
APPLICATION NO. : 11/583273
DATED : January 5, 2010
INVENTOR(S) : Thomas P. Chu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 501 days.

Signed and Sealed this

Twenty-first Day of December, 2010

David J. Kappos
*Director of the United States Patent and Trademark Office*